(12) United States Patent
Kim et al.

(10) Patent No.: US 12,386,704 B2
(45) Date of Patent: Aug. 12, 2025

(54) CONTROLLER AND METHOD OF OPERATING THE SAME

(71) Applicant: SK hynix Inc., Gyeonggi-do (KR)

(72) Inventors: Jung Ae Kim, Gyeonggi-do (KR); Jee Yul Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 229 days.

(21) Appl. No.: 17/994,908

(22) Filed: Nov. 28, 2022

(65) Prior Publication Data

US 2023/0385151 A1 Nov. 30, 2023

(30) Foreign Application Priority Data

May 31, 2022 (KR) .......................... 10-2022-0066457

(51) Int. Cl.
*G06F 11/10* (2006.01)
*G06F 11/08* (2006.01)

(52) U.S. Cl.
CPC ............ *G06F 11/108* (2013.01); *G06F 11/08* (2013.01); *G06F 11/1048* (2013.01); *G06F 2201/805* (2013.01)

(58) Field of Classification Search
CPC ...... G06F 11/08; G06F 11/1048; G06F 11/10; G11B 20/18
See application file for complete search history.

(56) References Cited

U.S. PATENT DOCUMENTS

2016/0364181 A1* 12/2016 McGlaughlin ........ G06F 3/0629
2020/0409787 A1* 12/2020 Yip ..................... G06F 11/1096
2021/0335432 A1* 10/2021 Manganelli ............ G11C 16/10

FOREIGN PATENT DOCUMENTS

KR  10-2018-0001711 A  1/2018
KR  10-2021-0039174 A  4/2021

* cited by examiner

*Primary Examiner* — Yolanda L Wilson
(74) *Attorney, Agent, or Firm* — IP & T GROUP LLP

(57) ABSTRACT

A controller controls a semiconductor memory device including a plurality of pages. The controller includes a command generator configured to generate a command for controlling a program operation or a read operation of a semiconductor memory device, and a data recovery manager configured to generate parity data corresponding to a weak page among a plurality of pages included in the semiconductor memory device and recover data programmed to the weak page.

19 Claims, 14 Drawing Sheets

FIG. 10

| | BLKq |
|---|---|
| WL16 | PAGE 16 |
| WL15 | PAGE 15 |
| WL14 | PAGE 14 |
| WL13 | PAGE 13 |
| WL12 | PAGE 12 |
| WL11 | PAGE 11 |
| WL10 | PAGE 10 |
| WL9 | PAGE 9 |
| WL8 | PAGE 8 |
| WL7 | PAGE 7 |
| WL6 | PAGE 6 |
| WL5 | PAGE 5 |
| WL4 | PAGE 4 |
| WL3 | PAGE 3 ⇐ $DATA_{PRT3}$ |
| WL2 | PAGE 2 ⇐ $DATA_{PRT2}$ |
| WL1 | PAGE 1 ⇐ $DATA_{PRT1}$ |

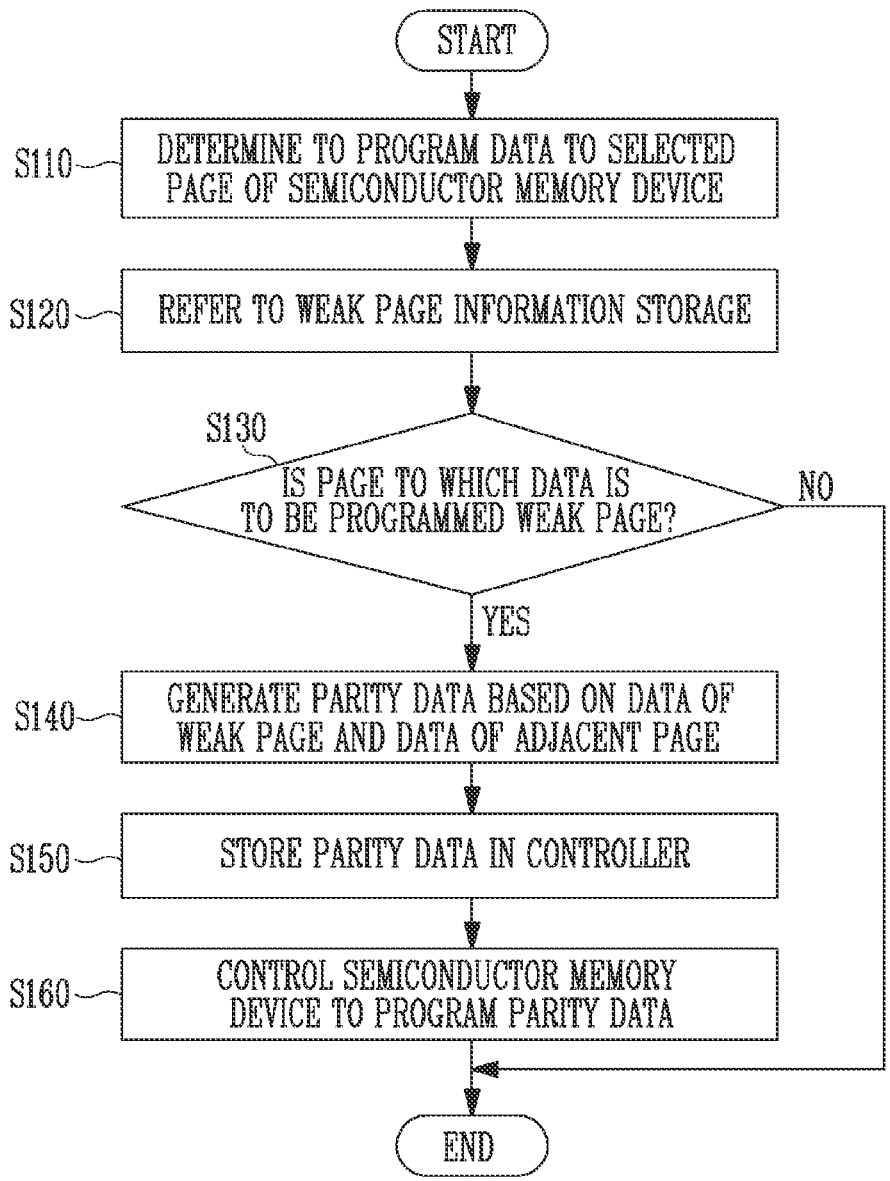

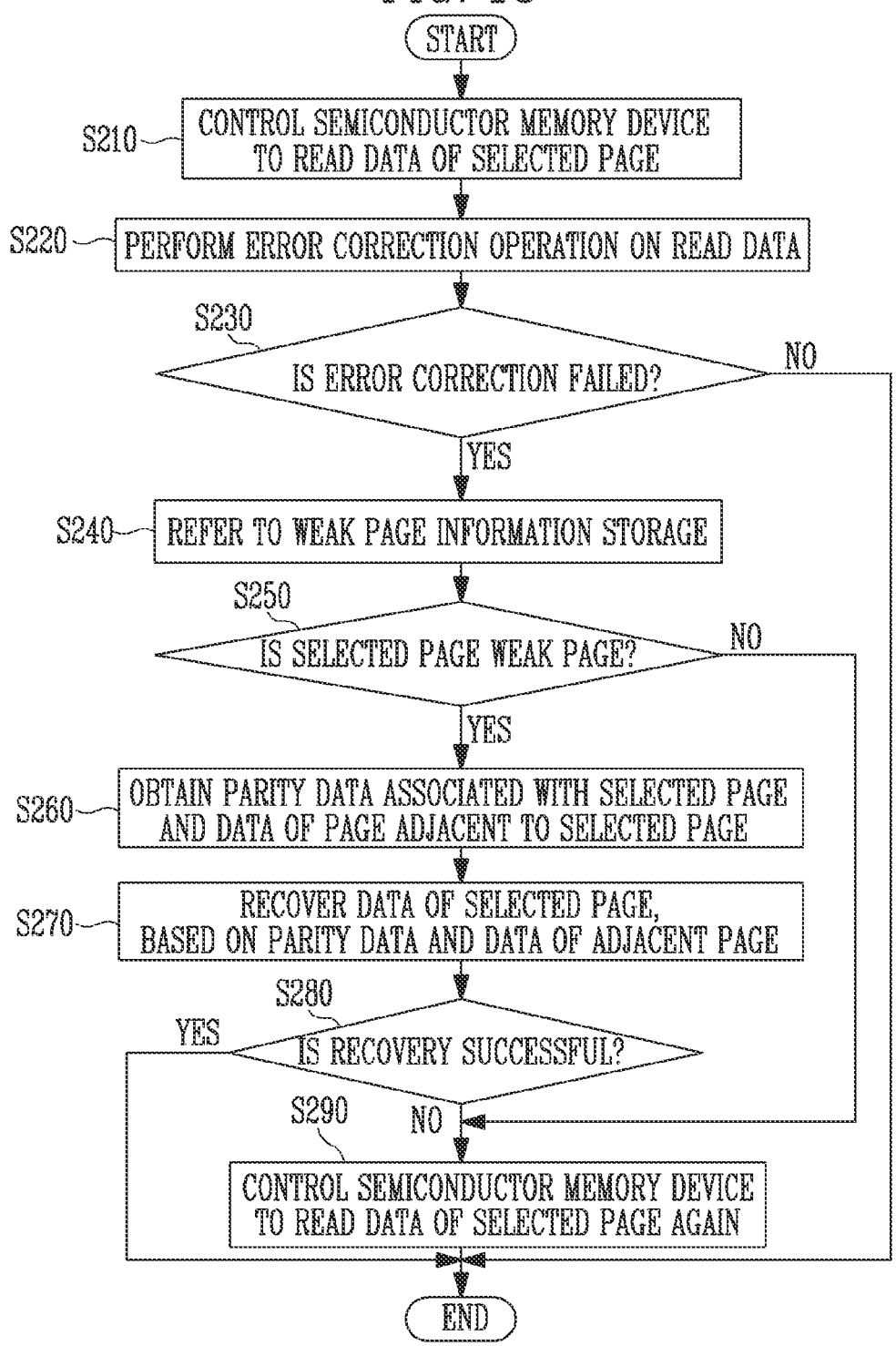

CONTROLLER AND METHOD OF OPERATING THE SAME

CROSS-REFERENCE TO RELATED APPLICATION

The present application claims priority under 35 U.S.C. § 119(a) to Korean patent application number 10-2022-0066457, filed on May 31, 2022, the entire disclosure of which is incorporated herein by reference.

BACKGROUND

Field of Invention

The present disclosure relates to an electronic device, and more particularly, to a controller controlling a data recovery operation of a semiconductor memory device and a method of operating the controller.

Description of Related Art

A semiconductor memory device may be formed in a two-dimensional structure in which strings are horizontally arranged on a semiconductor substrate, or in a three-dimensional structure in which the strings are vertically stacked on the semiconductor substrate. A three-dimensional semiconductor memory device is a memory device designed in order to resolve a limit of an integration degree of a two-dimensional semiconductor memory device, and may include a plurality of memory cells that are vertically stacked on a semiconductor substrate.

A controller may control an operation of the semiconductor memory device. Specifically, in response to a request received from a host, the controller controls the semiconductor memory device to perform an operation corresponding to the request by transmitting a command to the semiconductor memory device. When an uncorrectable error is included in data read from the semiconductor memory device, the controller may control the semiconductor memory device to perform a recovery operation for the corresponding data.

SUMMARY

An embodiment of the present disclosure provides a controller capable of efficiently recovering data and a method of operating the same.

According to an embodiment of the present disclosure, a controller controls a semiconductor memory device including a plurality of pages. The controller includes a command generator configured to generate a command for controlling a program operation or a read operation of a semiconductor memory device, and a data recovery manager configured to generate parity data corresponding to a weak page among a plurality of pages included in the semiconductor memory device and recover data programmed to the weak page.

In an embodiment of the present disclosure, the data recovery manager may generate the parity data based on data programmed to the weak page and data programmed to a page adjacent to the weak page.

According to another embodiment of the present disclosure, a semiconductor memory device including a plurality of pages is controlled by a method of operating a controller. The method of operating the controller includes determining whether to program data to a selected page among a plurality of pages included in a semiconductor memory device, determining whether the selected page is a weak page, and generating parity data based on data programmed to the selected page and data programmed to a page adjacent to the selected page, in response to determining that the selected page is the weak page.

According to still another embodiment of the present disclosure, a semiconductor memory device including a plurality of pages is controlled by a method of operating a controller. The method of operating the controller includes controlling a semiconductor memory device to read data programmed in a weak page among a plurality of pages included in the semiconductor memory device, receiving data of the weak page from the semiconductor memory device and performing an error correction operation on the received data, obtaining parity data associated with the weak page and data programmed to a page adjacent to the weak page, in response to determining that error correction of the received data is failed, and recovering the data of the weak page based on the parity data associated with the weak page and the data programmed to the page adjacent to the weak page.

According to still another embodiment of the present disclosure, a memory system includes a semiconductor memory device and a controller. The semiconductor memory device includes a plurality of pages. The controller is configured to control the semiconductor memory device. The controller includes a command generator and a data recovery manager. The command generator is configured to generate a command for controlling a program operation or a read operation on the plurality of pages. The data recovery manager is configured to generate parity data corresponding to a weak page among the plurality of pages and recover data programmed to the weak page.

The present technology may provide a controller capable of efficiently recovering data and a method of operating the same.

BRIEF DESCRIPTION OF THE DRAWINGS

FIG. 10 is a diagram illustrating a memory block that stores the parity data according to an embodiment of the present disclosure.

FIG. 11 is a flowchart illustrating a method of operating a controller according to an embodiment of the present disclosure.

FIG. 13 is a flowchart illustrating a method of operating a controller according to another embodiment of the present disclosure.

DETAILED DESCRIPTION

Specific structural or functional descriptions of embodiments according to the concept which are disclosed in the present specification are illustrated only to describe the embodiments according to the concept of the present disclosure, and the embodiments according to the concept of the present disclosure may be implemented in various forms and should not be construed as being limited to the embodiments described in the present specification.

Figure 1:
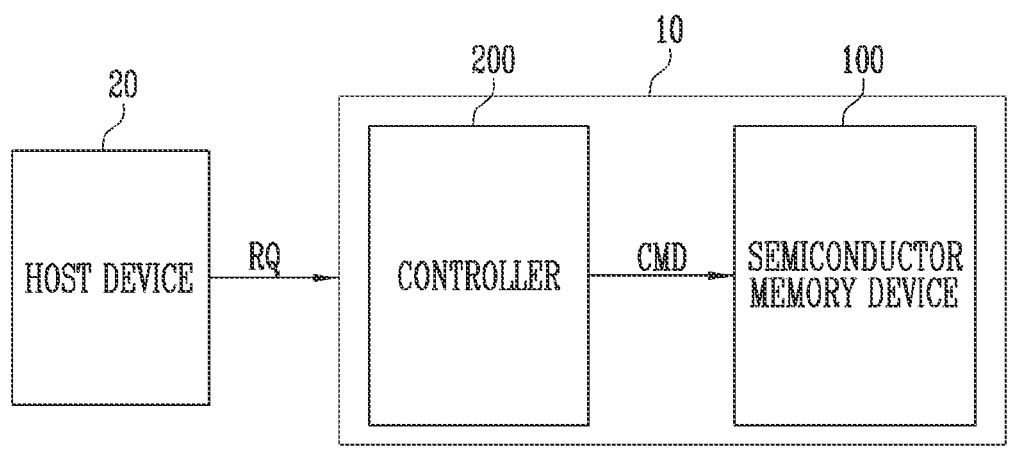
FIG. 1 is a block diagram illustrating a storage device and a host device according to an embodiment of the present disclosure.

FIG. 1 is a block diagram illustrating a storage device and a host device according to an embodiment of the present disclosure.

Referring to FIG. 1, the storage device 10 includes a semiconductor memory device 100 and a controller 200. In addition, the storage device 10 communicates with the host device 20. The controller 200 controls an overall operation of the semiconductor memory device 100. In addition, the controller 200 controls the operation of the semiconductor memory device 100 based on an operation request RQ received from the host device 20.

The semiconductor memory device 100 operates in response to control of the controller 200. The semiconductor memory device 100 includes a memory cell array having a plurality of memory blocks. In an embodiment, the semiconductor memory device 100 may be a flash memory device.

The controller 200 may exchange user data based on the request RQ from the host device 20. Specifically, the controller 200 may receive a write request, a read request, a trim request, or the like of the host device 20, and control the semiconductor memory device 100 based on the received requests. More specifically, the controller 200 may generate commands CMD for controlling the operation of the semiconductor memory device 100 and transmit the commands CMD to the semiconductor memory device 100. Furthermore, the controller 200 may exchange data with the semiconductor memory device 100.

The semiconductor memory device 100 is configured to receive a command and an address from the controller 200 and access an area selected by the address in the memory cell array. That is, the semiconductor memory device 100 performs an internal operation corresponding to the command with respect to the area selected by the address.

For example, the semiconductor memory device 100 may perform a program operation, a read operation, and an erase operation. During the program operation, the semiconductor memory device 100 may program data in the area selected by the address. During the read operation, the semiconductor memory device 100 may read data from the area selected by the address. During the erase operation, the semiconductor memory device 100 may erase data stored in the area selected by the address.

Figure 2:
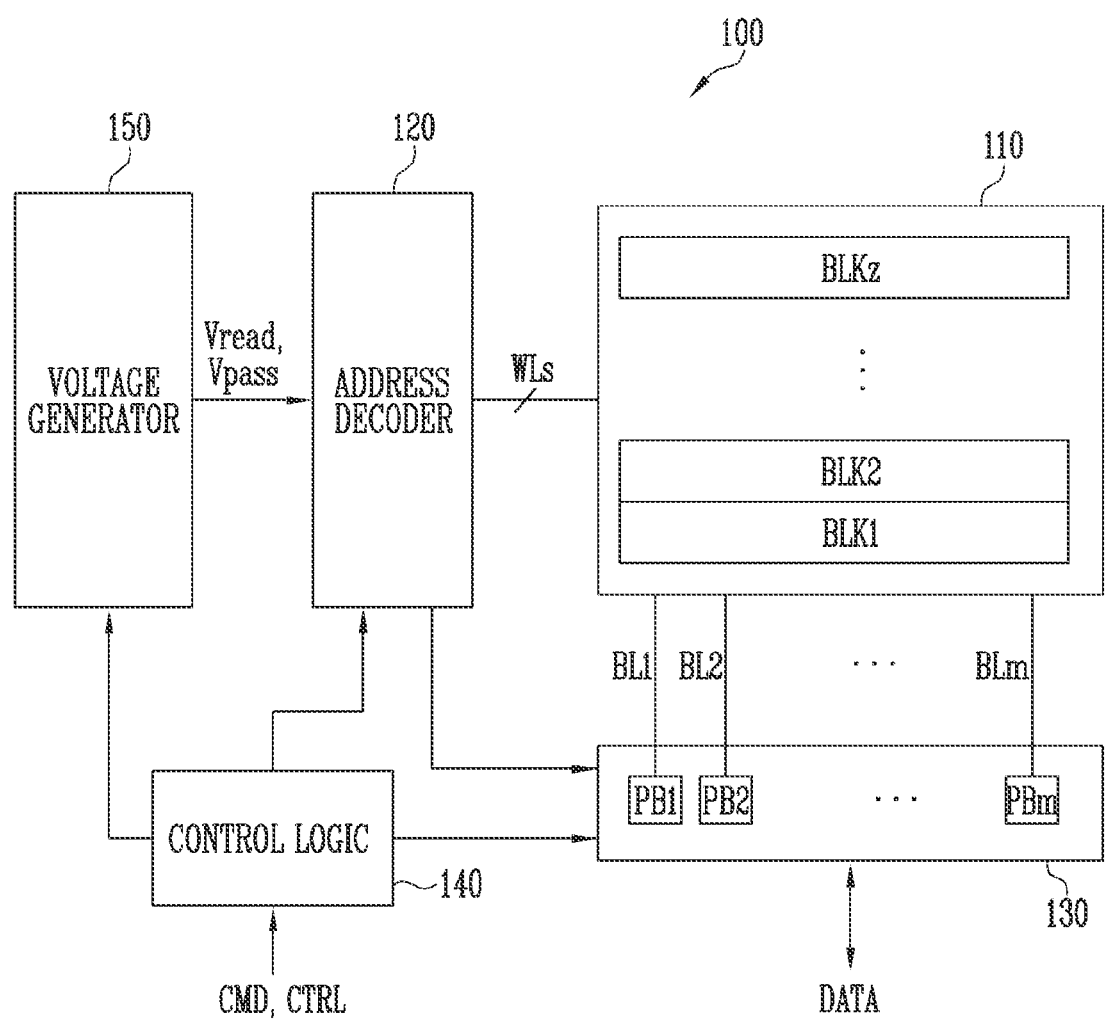
FIG. 2 is a block diagram illustrating a semiconductor memory device of FIG. 1 according to an embodiment of the present disclosure.

FIG. 2 is a block diagram illustrating the semiconductor memory device of FIG. 1 according to an embodiment of the present disclosure.

Referring to FIG. 2, the semiconductor memory device 100 includes a memory cell array 110, an address decoder 120, a read and write circuit 130, a control logic 140, and a voltage generator 150.

The memory cell array 110 includes a plurality of memory blocks BLK1 to BLKz. The plurality of memory blocks BLK1 to BLKz are connected to the address decoder 120 through word lines WLs. The plurality of memory blocks BLK1 to BLKz are connected to the read and write circuit 130 through bit lines BL1 to BLm. Each of the plurality of memory blocks BLK1 to BLKz includes a plurality of memory cells. In an embodiment, the plurality of memory cells are non-volatile memory cells, and may be configured of non-volatile memory cells having a vertical channel structure. The memory cell array 110 may be configured as a memory cell array of a two-dimensional structure. According to an embodiment, the memory cell array 110 may be configured as a memory cell array of a three-dimensional structure. Each of the plurality of memory cells included in the memory cell array may store at least one bit of data. In an embodiment, each of the plurality of memory cells included in the memory cell array 110 may be a single-level cell (SLC) storing one bit of data. In another embodiment, each of the plurality of memory cells included in the memory cell array 110 may be a multi-level cell (MLC) storing two bits of data. In still another embodiment, each of the plurality of memory cells included in the memory cell array 110 may be a triple-level cell storing three bits of data. In still another embodiment, each of the plurality of memory cells included in the memory cell array 110 may be a quad-level cell storing four bits of data. According to an embodiment, the memory cell array 110 may include a plurality of memory cells each storing five or more bits of data.

The address decoder 120, the read and write circuit 130, the control logic 140, and the voltage generator 150 operate as a peripheral circuit that drives the memory cell array 110. The address decoder 120 is connected to the memory cell array 110 through the word lines WLs. The address decoder 120 is configured to operate in response to control of the control logic 140. The address decoder 120 receives an address through an input/output buffer (not shown) inside the semiconductor memory device 100.

The address decoder 120 is configured to decode a block address among received addresses. The address decoder 120 selects at least one memory block according to the decoded block address. In addition, the address decoder 120 applies a read voltage Vread generated by the voltage generator 150 to a selected word line among the selected memory block at a read voltage application operation during a read operation, and applies a pass voltage Vpass to the remaining unselected word lines. In addition, the address decoder 120 applies a verify voltage generated by the voltage generator 150 to the selected word line among the selected memory block and applies the pass voltage Vpass to the remaining unselected word lines during a program verify operation.

The address decoder 120 is configured to decode a column address of the received addresses. The address decoder 120 transmits the decoded column address to the read and write circuit 130.

The read operation and a program operation of the semiconductor memory device 100 are performed in a page unit. Addresses received at a time of a request of the read operation and the program operation include a block address, a row address, and a column address. The address decoder 120 selects one memory block and one word line according to the block address and the row address. The column address is decoded by the address decoder 120 and is provided to the read and write circuit 130.

The address decoder 120 may include a block decoder, a row decoder, a column decoder, an address buffer, and the like.

The read and write circuit 130 includes a plurality of page buffers PB1 to PBm. The read and write circuit 130 may operate as a "read circuit" during a read operation of the memory cell array 110 and may operate as a "write circuit" during a write operation of the memory cell array 110. The plurality of page buffers PB1 to PBm are connected to the memory cell array 110 through the bit lines BL1 to BLm. During the read operation and the program verify operation, in order to sense a threshold voltage of the memory cells, the plurality of page buffers PB1 to PBm sense a change of an amount of a current flowing according to a program state of a corresponding memory cell through a sensing node while continuously supplying a sensing current to the bit lines connected to the memory cells, and latches the sensed change as sensing data. The read and write circuit 130 operates in response to page buffer control signals output from the control logic 140.

During the read operation, the read and write circuit 130 senses data of the memory cell, temporarily stores read data, and outputs data DATA to the input/output buffer (not shown) of the semiconductor memory device 100. In an embodiment, the read and write circuit 130 may include a column selection circuit, and the like, in addition to the page buffers (or page registers).

The control logic 140 is connected to the address decoder 120, the read and write circuit 130, and the voltage generator 150. The control logic 140 receives a command CMD and a control signal CTRL through the input/output buffer (not shown) of the semiconductor memory device 100. The control logic 140 is configured to control overall operations of the semiconductor memory device 100 in response to the control signal CTRL. In addition, the control logic 140 outputs a control signal for adjusting a sensing node precharge potential level of the plurality of page buffers PB1 to PBm. The control logic 140 may control the read and write circuit 130 to perform the read operation of the memory cell array 110.

The voltage generator 150 generates the read voltage Vread and the pass voltage Vpass during the read operation in response to the control signal output from the control logic 140. In order to generate a plurality of voltages having various voltage levels, the voltage generator 150 may include a plurality of pumping capacitors that receive an internal power voltage, and generate the plurality of voltages by selectively activating the plurality of pumping capacitors in response to the control of the control logic 140.

The address decoder 120, the read and write circuit 130, and the voltage generator 150 may function as a "peripheral circuit" that performs the read operation, the write operation, and the erase operation on the memory cell array 110. The peripheral circuit performs the read operation, the write operation, and the erase operation on the memory cell array 110 based on the control of the control logic 140.

Figure 3:
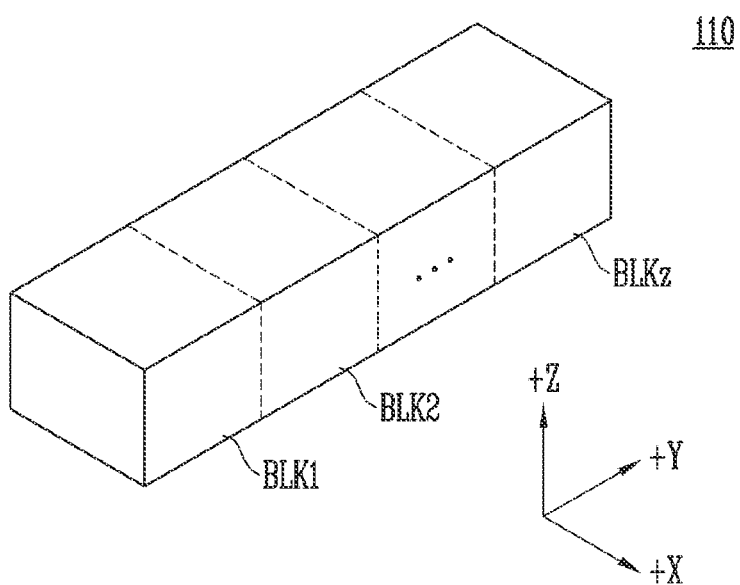
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the memory cell array 110 includes a plurality of memory blocks BLK1 to BLKz. Each memory block may have a three-dimensional structure. Each memory block includes a plurality of memory cells stacked on a substrate. The plurality of memory cells are arranged along a +X direction, a +Y direction, and a +Z direction. A structure of each memory block of the three-dimensional structure is described in more detail with reference to FIG. 4.

Figure 4:
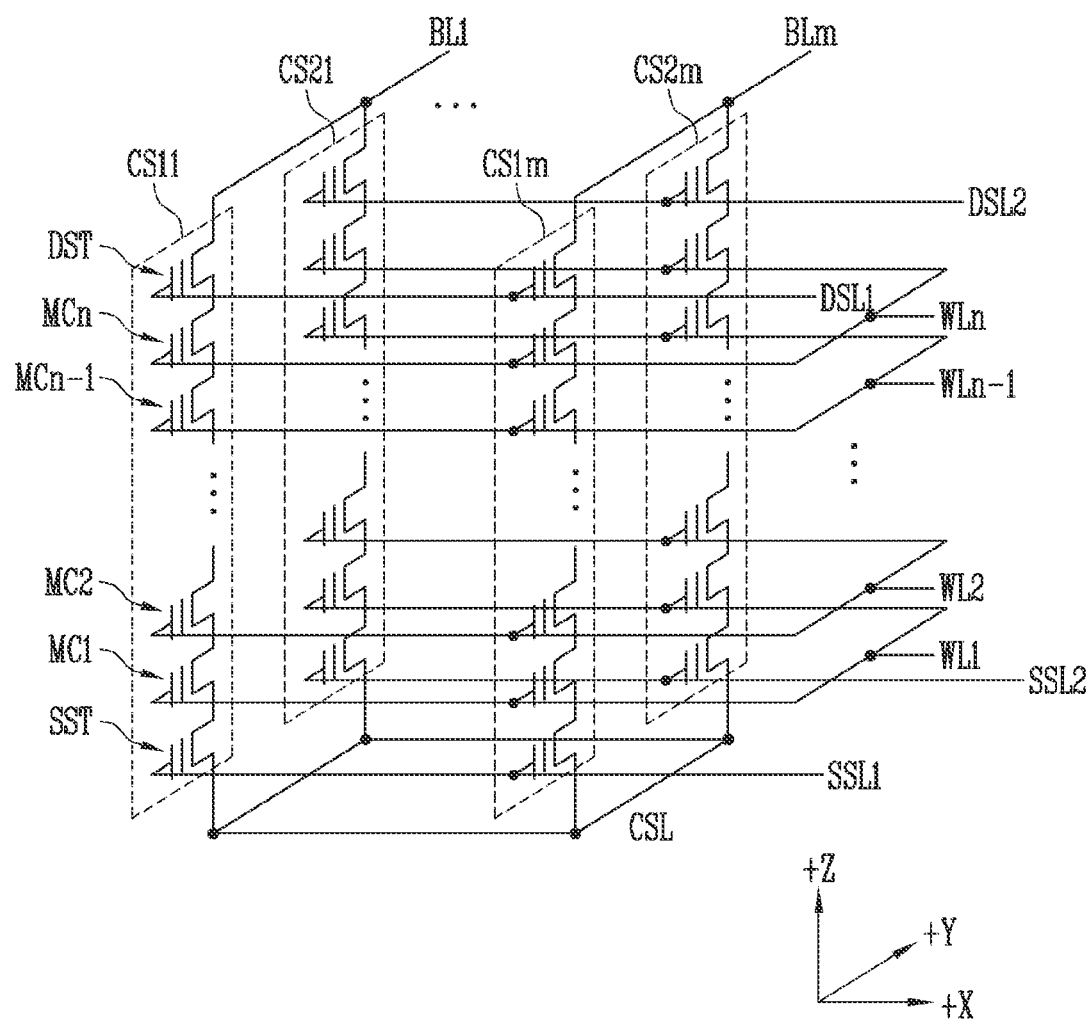
FIG. 4 is a circuit diagram illustrating a memory block among memory blocks shown in FIG. 3 according to an embodiment of the present disclosure.

FIG. 4 is a circuit diagram illustrating a memory block BLKa among the memory blocks BLK1 to BLKz of FIG. 3 according to an embodiment of the present disclosure.

Referring to FIG. 4, the memory block BLKa includes a plurality of cell strings CS11 to CS1*m* and CS21 to CS2*m*. In the memory block BLKa, m cell strings are arranged in a row direction (that is, the +X direction). In FIG. 4, two cell strings are arranged in a column direction (that is, the +Y direction). However, this is for convenience of description and it may be understood that three or more cell strings may be arranged in the column direction.

Each of the plurality of cell strings CS11 to CS1*m* and CS21 to CS2*m* includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between a common source line CSL and the memory cells MC1 to MCn.

In an embodiment, the source select transistors of the cell strings arranged in the same row are connected to a source select line extending in the row direction, and the source select transistors of the cell strings arranged in different rows are connected to different source select lines. In FIG. 4, the source select transistors of the cell strings CS11 to CS1*m* of a first row are connected to a first source select line SSL1. The source select transistors of the cell strings CS21 to CS2*m* of a second row are connected to a second source select line SSL2.

In another embodiment, the source select transistors of the cell strings CS11 to CS1*m* and CS21 to CS2*m* may be commonly connected to one source select line.

The first to n-th memory cells MC1 to MCn of each cell string are connected in series between the source select transistor SST and the drain select transistor DST. Gates of the first to n-th memory cells MC1 to MCn are connected to first to n-th word lines WL1 to WLn, respectively.

The drain select transistor DST of each cell string is connected between a corresponding bit line and the memory cells MC1 to MCn. Cell strings arranged in the row direction are connected to the drain select line extending in the row direction. The drain select transistors of the cell strings CS11 to CS1m of the first row are connected to a first drain select line DSL1. The drain select transistors of the cell strings CS21 to CS2m of the second row are connected to a second drain select line DSL2.

The cell strings arranged in the column direction are connected to the bit lines extending in the column direction. In FIG. 4, the cell strings CS11 and CS21 of the first column are connected to the first bit line BL1. The cell strings CS1m and CS2m of the m-th column are connected to the m-th bit line BLm.

The memory cells connected to the same word line in the cell strings arranged in the row direction configure one page. For example, the memory cells connected to the first word line WL1, among the cell strings CS11 to CS1m of the first row configure one page. The memory cells connected to the first word line WL1, among the cell strings CS21 to CS2m of the second row configure another page. The cell strings arranged in one row direction may be selected by selecting one of the drain select lines DSL1 and DSL2. One page of the selected cell strings may be selected by selecting one of the word lines WL1 to WLn.

In another embodiment, even bit lines and odd bit lines may be provided instead of the first to m-th bit lines BL1 to BLm. In addition, even-numbered cell strings among the cell strings CS11 to CS1m or CS21 to CS2m arranged in the row direction may be connected to the bit lines, and odd-numbered cell strings among the cell strings CS11 to CS1m or CS21 to CS2m arranged in the row direction may be connected to odd bit lines, respectively.

In an embodiment, at least one of the first to n-th memory cells MC1 to MCn may be used as a dummy memory cell. For example, at least one or more dummy memory cells are provided to reduce an electric field between the source select transistor SST and the memory cells MC1 to MCn. Alternatively, at least one or more dummy memory cells are provided to reduce an electric field between the drain select transistor DST and the memory cells MC1 to MCn. As more dummy memory cells are provided, reliability of an operation for the memory block BLKa is improved, however, the size of the memory block BLKa increases. As less memory cells are provided, the size of the memory block BLKa may be reduced, however, the reliability of the operation for the memory block BLKa may be reduced.

In order to efficiently control at least one dummy memory cell, each of the dummy memory cells may have a required threshold voltage. Before or after an erase operation for the memory block BLKa, program operations for all or a part of the dummy memory cells may be performed. When the erase operation is performed after the program operation is performed, the dummy memory cells may have a required threshold voltage by controlling a voltage applied to dummy word lines connected to the respective dummy memory cells.

Figure 5:
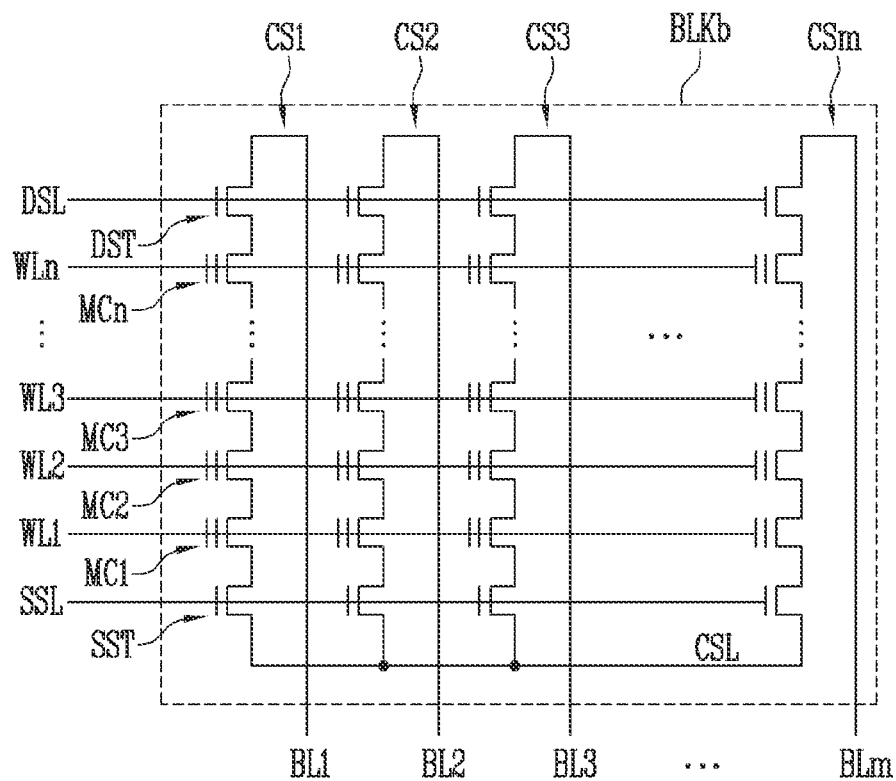
FIG. 5 is a circuit diagram illustrating a memory block among the plurality of memory blocks included in the memory cell array shown in FIG. 2 according to an embodiment of the present disclosure.

FIG. 5 is a circuit diagram illustrating a memory block BLKb among the plurality of memory blocks BLK1 to BLKz included in the memory cell array 110 of FIG. 2 according to an embodiment of the present disclosure.

Referring to FIG. 5, the memory block BLKb includes a plurality of cell strings CS1 to CSm. The plurality of cell strings CS1 to CSm may be connected to a plurality of bit lines BL1 to BLm, respectively. Each of the cell strings CS1 to CSm includes at least one source select transistor SST, first to n-th memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. The source select transistor SST of each cell string is connected between a common source line CSL and the memory cells MC1 to MCn.

The first to n-th memory cells MC1 to MCn of each cell string are connected between the source select transistor SST and the drain select transistor DST.

The drain select transistor DST of each cell string is connected between a corresponding bit line and the memory cells MC1 to MCn.

Memory cells connected to the same word line configure one page. The cell strings CS1 to CSm may be selected by selecting the drain select line DSL. One page among the selected cell strings may be selected by selecting one of the word lines WL1 to WLn.

In another embodiment, even bit lines and odd bit lines may be provided instead of the first to m-th bit lines BL1 to BLm. Even-numbered cell strings among the cell strings CS1 to CSm may be connected to even bit lines, and odd-numbered cell strings may be connected to odd bit lines, respectively.

As shown in FIGS. 3 and 4, the memory blocks BLK1 to BLKz of the semiconductor memory device 100 may be configured as memory blocks of a three-dimensional structure. However, the present disclosure is not limited thereto, and as shown in FIG. 5, the memory blocks BLK1 to BLKz of the semiconductor memory device 100 may be configured as memory blocks of a two-dimensional structure.

In a production process of the semiconductor memory device 100, a weak page may occur. For some process reasons, a threshold voltage characteristic of memory cells included in a specific page may be relatively bad. A page including these memory cells is the weak page, and stored data is highly likely to be damaged compared to other pages. That is, the data stored in the weak page may include error bits of a level, which may not be recovered even by an error correction operation when reading the data later. In general, when an uncorrectable error occurs in the weak page, a read operation on a corresponding page is repeatedly performed while changing a read voltage. When data read is successful by repeatedly performing the read operation, a read-reclaim operation of programming the data programmed in the weak page to a different physical position may be performed. After the read-reclaim operation is performed, the memory block including the weak page is set as a bad block and the corresponding memory block is no longer used.

In a case according to a processing method described above, two problems occur. First, in a case where the semiconductor memory device 100 includes a large number of weak pages, read performance deterioration of the storage device may occur as the read operation is repeatedly performed when the read operation on the weak pages is failed. Second, in a case where the semiconductor memory device 100 includes a large number of weak pages, when an uncorrectable error occurs, since a corresponding memory block is set as a bad block, the number of usable memory blocks is rapidly reduced. Therefore, as a use period of the storage device 10 increases, a usable memory area is rapidly reduced. In particular, when the storage device 10 is used in an electric system of a vehicle, a relatively high durability life is required. This is because replacing the storage device 10 is difficult due to a characteristic of the electric system and a use life is long. As a result, a method of operating a controller capable of quickly recovering data when an error occurs in a weak page and maximally securing a usable memory block is required.

In accordance with a controller and a method of operating the same according to an embodiment of the present disclosure, when data is programmed to a weak page, parity data is generated based on data programmed in the weak page and data programmed in one or more pages adjacent to the weak page. When an uncorrectable error occurs in the weak page during a read operation, the data programmed in the weak page is recovered based on the parity data. Accordingly, even though an error occurs in the weak page, the corresponding data may be quickly recovered. In addition, even though an error occurs in the weak page, since a memory block including the weak page may be used as it is, a usable memory block in the storage device may be maximally secured.

In the above description, the weak page is a page including a defect occurring in the production process of the storage device, but the present disclosure is not limited thereto. For example, when an error bit is detected a certain level or more in data stored in a normal page during a use process of the storage device, the corresponding page may be determined as the weak page.

Figure 6:
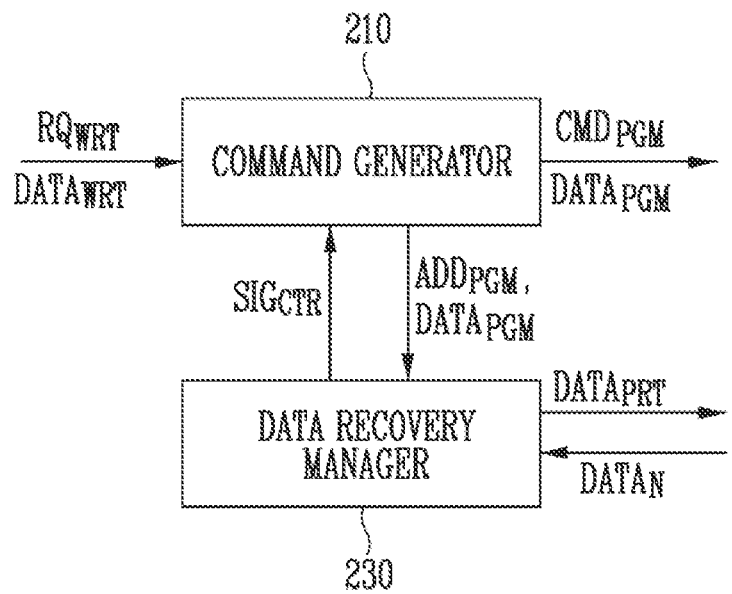
FIG. 6 is a block diagram illustrating a controller according to an embodiment of the present disclosure.

FIG. 6 is a block diagram illustrating the controller 200 according to an embodiment of the present disclosure. Referring to FIG. 6, the controller 200 according to an embodiment of the present disclosure may include a command generator 210 and a data recovery manager 230.

The command generator 210 may receive a write request $RQ_{WRT}$ and write data $DATA_{WRT}$ from the host device 20. The command generator 210 may generate a program command $CMD_{PGM}$ in response to the write request $RQ_{WRT}$ received from the host device 20. The command generator 210 may transmit the program command $CMD_{PGM}$ and program data $DATA_{PGM}$ to the semiconductor memory device 100. The program data $DATA_{PGM}$ may be data generated from the write data $DATA_{WRT}$ received from the host device 20.

The command generator 210 may transmit a program address $ADD_{PGM}$ indicating a physical position to which the program data $DATA_{PGM}$ is to be programmed to the data recovery manager 230. Moreover, although not shown in FIG. 6, the program address $ADD_{PGM}$ may be transmitted to the semiconductor memory device 100 together with the program command $CMD_{PGM}$ and the program data $DATA_{PGM}$. The semiconductor memory device 100 may program the program data $DATA_{PGM}$ to the physical position corresponding to the program address $ADD_{PGM}$ in response to the program command $CMD_{PGM}$. The data recovery manager 230 receives the program address $ADD_{PGM}$ from the command generator 210 and determines whether a page corresponding to the program address $ADD_{PGM}$ is the weak page. When the page corresponding to the program address $ADD_{PGM}$ is the weak page, the data recovery manager 230 generates the parity data based on the program data $DATA_{PGM}$ and the data programmed in the page adjacent to the weak page. To this end, the program data $DATA_{PGM}$ may be transmitted from the command generator 210 to the data recovery manager 230.

In an embodiment, in order to obtain the data programmed in the page adjacent to the weak page, the data recovery manager 230 may transmit a control signal $SIG_{CTR}$ to the command generator 210. The command generator 210 may generate a read command for reading the data from the page adjacent to the weak page based on the control signal $SIG_{CTR}$. The command generator 210 may transmit the generated read command to the semiconductor memory device 100. The semiconductor memory device 100 may perform a read operation in response to the received read command. The data programmed in the page adjacent to the weak page, that is, adjacent data $DATA_N$, is read by the read operation of the semiconductor memory device 100. The semiconductor memory device 100 transmits the read adjacent data $DATA_N$ to the controller 200. The data recovery manager 230 of the controller 200 receives the adjacent data $DATA_N$ and generates the parity data $DATA_{PRT}$ based on the adjacent data $DATA_N$ and the program data $DATA_{PGM}$.

In an embodiment, the data recovery manager 230 may generate the parity data $DATA_{PRT}$ by performing an exclusive-OR (XOR) operation on the adjacent data $DATA_N$ and the program data $DATA_{PGM}$. Specifically, the data recovery manager 230 performs an exclusive-OR (XOR) operation on bits included in the adjacent data $DATA_N$ and bits included in the program data $DATA_{PGM}$, respectively, and generates the parity data $DATA_{PRT}$ including bits generated as a result of performing the exclusive-OR (XOR) operation. For example, the data recovery manager 230 may perform an exclusive-OR (XOR) operation on a first bit included in the adjacent data $DATA_N$ and a first bit included in the program data $DATA_{PGM}$, and determine a bit calculated as a result of performing the exclusive-OR (XOR) operation as a first bit of the parity data $DATA_{PRT}$. In addition, the data recovery manager 230 may perform an exclusive-OR (XOR) operation on a second bit included in the adjacent data $DATA_N$ and a second bit included in the program data $DATA_{PGM}$, and determine a bit calculated as a result of performing the exclusive-OR (XOR) operation as a second bit of the parity data $DATA_{PRT}$. In such a method, the bits included in the parity data $DATA_{PRT}$ may be calculated, by performing the exclusive-OR (XOR) operation on the respective bits included in the adjacent data $DATA_N$ and the corresponding bits of the program data $DATA_{PGM}$.

The data recovery manager 230 may maintain the generated parity data $DATA_{PRT}$. In an embodiment, the data recovery manager 230 may transmit the generated parity data $DATA_{PRT}$ to the semiconductor memory device 100. In this case, the parity data $DATA_{PRT}$ may be programmed to the memory cell array of the semiconductor memory device 100. To this end, the command generator 210 of the controller 200 may generate a program command for programming the parity data $DATA_{PRT}$, and transmit the generated program command to the semiconductor memory device 100 together with the parity data $DATA_{PRT}$.

In an embodiment, the parity data $DATA_{PRT}$ may be programmed to a memory block different from the memory block including the weak page. That is, the page to which the parity data $DATA_{PRT}$ is programmed and the weak page belong to different memory blocks. According to an embodiment, the semiconductor memory device 100 may include a dedicated memory block for programming only the parity data $DATA_{PRT}$.

For stability of the parity data $DATA_{PRT}$, the dedicated memory block to which the parity data $DATA_{PRT}$ is programmed may include a single-level cell (SLC). That is, the parity data $DATA_{PRT}$ may be programmed in an SLC method.

Figure 7:
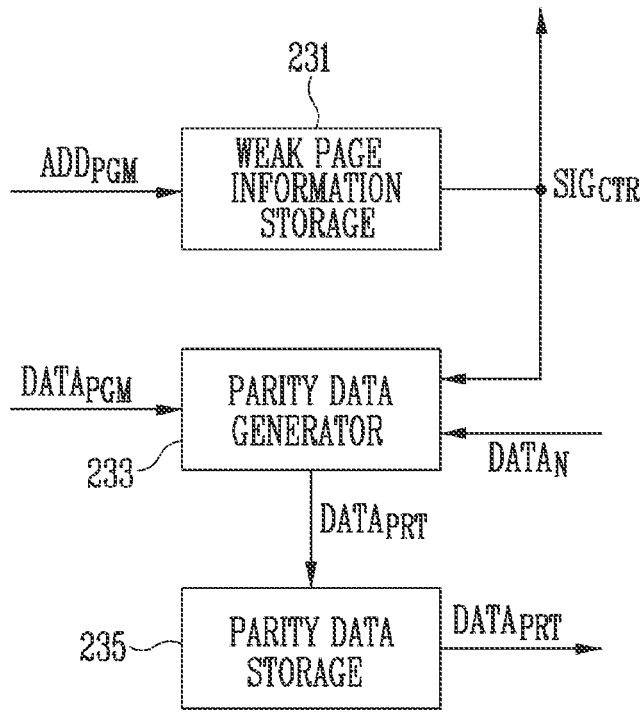
FIG. 7 is a block diagram illustrating a data recovery manager shown in FIG. 6 according to an embodiment of the present disclosure.

FIG. 7 is a block diagram illustrating the data recovery manager 230 of FIG. 6 according to an embodiment of the present disclosure. Referring to FIG. 7, the data recovery manager 230 may include a weak page information storage 231, a parity data generator 233, and a parity data storage 235.

The weak page information storage 231 stores information for identifying weak pages among pages included in the semiconductor memory device 100. That is, weak page information indicating which page among the pages included in the semiconductor memory device 100 is the weak page may be stored in the weak page information storage 231.

In an embodiment, the weak page information may be obtained in a manufacturing step of the semiconductor memory device 100. That is, the weak page may be detected in a manufacturing test step of the semiconductor memory device 100. In another embodiment, the weak page information may be obtained while the semiconductor memory device 100 is used. For example, when error bits equal to or greater than a specific threshold value are included in data read from a normal page other than the weak page, the controller 200 may determine the corresponding page as a new weak page. In this case, information on the new weak page may be additionally stored in the weak page information storage 231.

When the weak page information storage 231 is configured as a non-volatile memory, the weak page information storage 231 may maintain the weak page information even though the storage device 10 is turned off. On the other hand, when the weak page information storage 231 is configured as a volatile memory, the weak page information storage 231 may not maintain the weak page information when the storage device 10 is turned off. In this case, the weak page information may be stored in a specific area in the memory cell array of the semiconductor memory device 100. When the storage device 10 is turned on, the semiconductor memory device 100 may read the weak page information from the memory cell array and transmit the weak page information to the controller 200. The weak page information storage 231 may store the weak page information received from the semiconductor memory device 100.

The weak page information storage 231 receives the program address $ADD_{PGM}$ and determines whether the page corresponding to the program address $ADD_{PGM}$ is the weak page. Specifically, when the weak page information related to the page corresponding to the program address $ADD_{PGM}$ is stored, the page corresponding to the program address $ADD_{PGM}$ is determined as the weak page. On the other hand, when the weak page information related to the page corresponding to the program address $ADD_{PGM}$ is not stored, it is determined that the page corresponding to the program address $ADD_{PGM}$ is not the weak page.

When the page corresponding to the program address $ADD_{PGM}$ is the weak page, the weak page information storage 231 transmits the control signal $SIG_{CTR}$ to the command generator 210 and the parity data generator 233. As described above, the command generator 210 may generate the read command for reading the data from the page adjacent to the weak page based on the control signal $SIG_{CTR}$. The adjacent data $DATA_N$ read in response to the corresponding read command may be transmitted to the parity data generator 233.

The parity data generator 233 receives the program data $DATA_{PGM}$. When the page corresponding to the program address $ADD_{PGM}$ is the weak page, the parity data generator 233 may receive the control signal $SIG_{CTR}$ and the adjacent data $DATA_N$. In response to the control signal $SIG_{CTR}$, the parity data generator 233 generates the parity data $DATA_{PRT}$ based on the adjacent data $DATA_N$ and the program data $DATA_{PGM}$. In an embodiment, the parity data generator 233 may generate the parity data $DATA_{PRT}$ by performing an exclusive-OR (XOR) operation on the adjacent data $DATA_N$ and the program data $DATA_{PGM}$.

The generated parity data $DATA_{PRT}$ may be transmitted to the parity data storage 235. The parity data storage 235 stores the received parity data $DATA_{PRT}$. When the parity data storage 235 is configured as a non-volatile memory, the parity data storage 235 may maintain the parity data $DATA_{PRT}$ even though the storage device 10 is turned off. On the other hand, when the parity data storage 235 is configured as a volatile memory, the parity data storage 235 may not maintain the parity data $DATA_{PRT}$ when the storage device 10 is turned off. In this case, the parity data $DATA_{PRT}$ may be stored in a specific area in the memory cell array of the semiconductor memory device 100.

Figure 8:
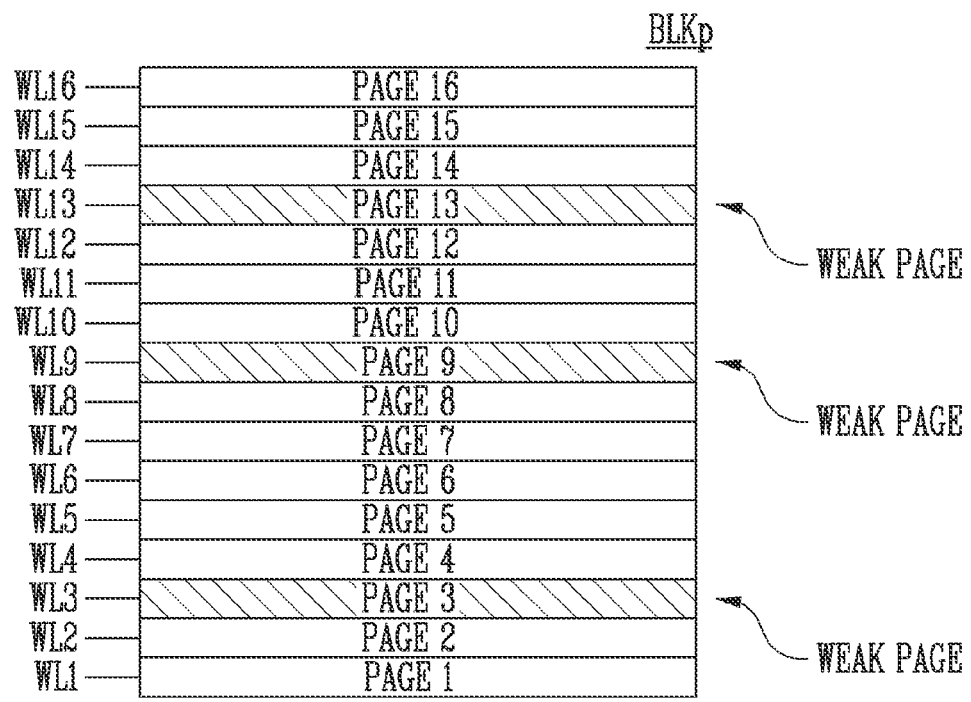
FIG. 8 is a diagram illustrating a weak page included in the memory block according to an embodiment of the present disclosure.

FIG. 8 is a diagram illustrating the weak page included in the memory block. Referring to FIG. 8, a memory block BLKp includes 16 physical pages PAGE 1 to PAGE 16. However, this is an example, and the number of physical pages included in one memory block may be greater than this number. However, for convenience of discussion, a memory block including 16 physical pages is described as an example.

Referring to FIG. 8, the first to sixteenth physical pages PAGE 1 to PAGE 16 are respectively connected to first to sixteenth word lines WL1 to WL16. In FIG. 8, a third page PAGE 3, a ninth page PAGE 9, and a thirteenth page PAGE 13 are weak pages. As described above, the weak page is a page including memory cells having a deteriorated characteristic, and is a page with a high possibility that a large number of error bits occur when reading data after programming the data.

The weak page information storage 231 may store weak page information indicating that the third page PAGE 3, the ninth page PAGE 9, and the thirteenth page PAGE 13 of the memory block BLKp are the weak pages. As described above, the weak page information may be generated based on a test in the production process of the semiconductor memory device 100. As another example, the weak page information may be generated by detecting occurrence of an error bit during actual use of the semiconductor memory device 100.

According to an embodiment of the present disclosure, when data is programmed to the weak page of the memory block BLKp, the parity data is generated based on the corresponding program data $DATA_{PGM}$ and the data programmed in the adjacent page. When an uncorrectable error occurs in the weak page during the read operation, the data programmed in the weak page is recovered based on the parity data. Accordingly, even though an error occurs in the weak page, the data may be quickly recovered. In addition, even though an error occurs in the weak page, since the memory block including the weak page may be used as it is, a usable memory block in the storage device may be maximally secured.

Figure 9A:
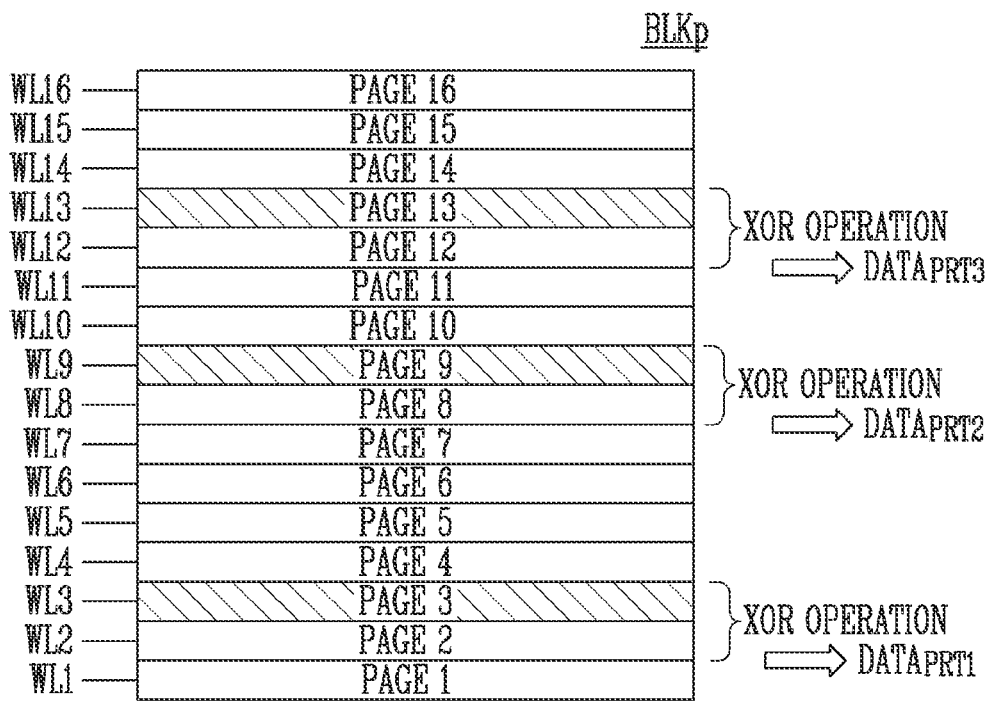
FIGS. 9A and 9B are diagrams illustrating generating parity data according to embodiments of the present disclosure.
Figure 9B:
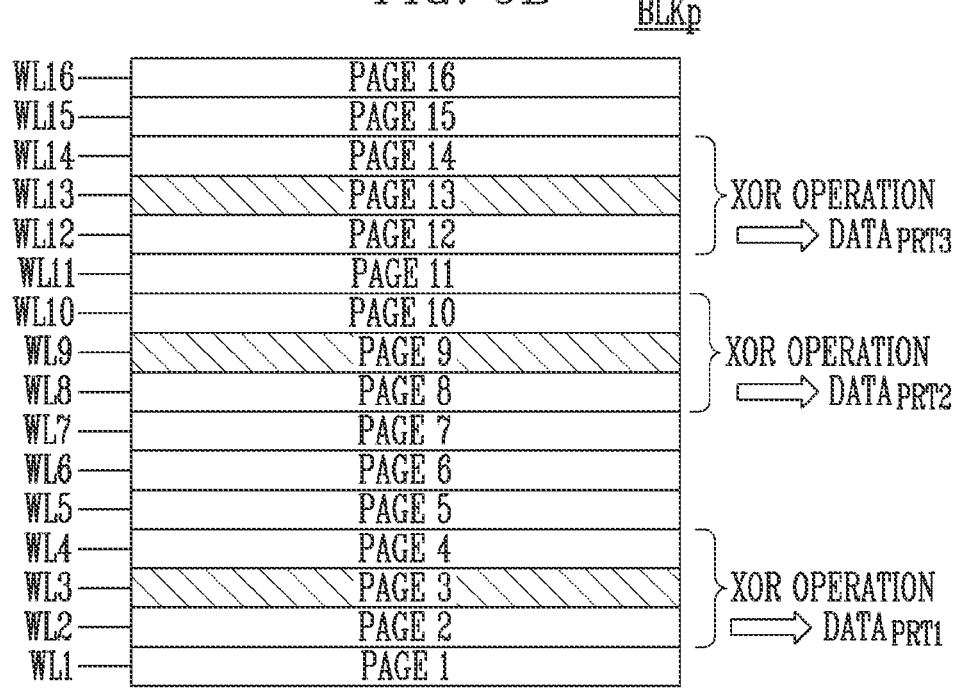

FIGS. 9A and 9B are diagrams illustrating generating the parity data according to embodiments of the present disclosure.

Referring to FIG. 9A, a first embodiment of generating the parity data based on the data programmed in the weak page and the data programmed in the adjacent page is shown. In FIG. 9A, when data is programmed to the weak page, the parity data may be generated by performing an exclusive-OR (XOR) operation on the data programmed in the corresponding weak page and one page adjacent thereto.

Specifically, when data is programmed to the third page PAGE 3 which is the weak page, parity data $DATA_{PRT1}$ may be generated by performing an XOR operation on the data programmed in the third page PAGE 3 and data programmed in a second page PAGE 2 adjacent thereto. In addition, when data is programmed to the ninth page PAGE 9 which is the weak page, parity data $DATA_{PRT2}$ may be generated by performing an XOR operation on the data programmed in the ninth page PAGE 9 and data programmed in an eighth page PAGE 8 adjacent thereto. When data is programmed to the thirteenth page PAGE 13 which is the weak page, the parity data $DATA_{PRT3}$ may be generated by performing an XOR operation on the data programmed in the thirteenth page PAGE 13 and data programmed in a twelfth page PAGE 12 adjacent thereto.

However, this is an example, and the parity data may be generated by another method. For example, the parity data may be generated by performing an XOR operation on the data programmed in the third page PAGE 3 and data programmed in a fourth page PAGE 4 adjacent thereto, the parity data may be generated by performing an XOR operation on the data programmed in the ninth page PAGE 9 and data programmed in a tenth page PAGE 10 adjacent thereto, and the parity data may be generated by performing an XOR operation on the data programmed in the thirteenth page PAGE 13 and data programmed in a fourteenth page PAGE 14 adjacent thereto.

A situation in which a program operation of data is performed in a direction from the first page PAGE 1 to the sixteenth page PAGE 16 is illustrated. In this case, when data is to be programmed to the third page PAGE 3, data may be already programmed in the second page PAGE 2. Therefore, the parity data $DATA_{PRT1}$ may be generated by reading the data from the second page PAGE 2, and then performing an XOR operation on the read data and the data read from the third page PAGE 3.

Referring to FIG. 9B, a second embodiment of generating the parity data based on the data programmed in the weak page and the data programmed in the adjacent pages is shown. In FIG. 9B, when data is programmed to the weak page, the parity data may be generated by performing an exclusive-OR (XOR) operation on the data programmed in the corresponding weak page and data programmed in two adjacent pages.

Specifically, when data is programmed to the third page PAGE 3 which is the weak page, the parity data $DATA_{PRT1}$ may be generated by performing an XOR operation on the data programmed in the third page PAGE 3 and data programmed in the second page PAGE 2 and the fourth page PAGE 4 adjacent thereto. In this case, an exclusive-OR (XOR) operation may be performed on a first bit included in the data programmed in the second page PAGE 2, a first bit included in the data programmed in the third page PAGE 3, and a first bit included in the data programmed in the fourth page PAGE 4, and a bit calculated as a result of the exclusive-OR (XOR) operation may be determined as a first bit of the parity data $DATA_{PRT1}$. In addition, an exclusive-OR (XOR) operation may be performed on a second bit included in the data programmed in the second page PAGE 2, a second bit included in the data programmed in the third page PAGE 3, and a second bit included in the data programmed in the fourth page PAGE 4, and a bit calculated as a result of the exclusive-OR (XOR) operation may be determined as a second bit of the parity data $DATA_{PRT1}$. In such a method, the parity data $DATA_{PRT1}$ may be generated based on the data programmed in the third page PAGE 3 which is the weak page and the data programmed in the second and fourth pages PAGE 2 and PAGE 4 adjacent to the third page.

Similarly, when data is programmed to the ninth page PAGE 9 which is the weak page, the parity data $DATA_{PRT2}$ may be generated by performing an XOR operation on the data programmed in the ninth page PAGE 9 and the data programmed in the eighth page PAGE 8 and the tenth page PAGE 10 adjacent thereto. When data is programmed to the thirteenth page PAGE 13 which is the weak page, the parity data $DATA_{PRT3}$ may be generated by performing an XOR operation on the data programmed in the thirteenth page PAGE 13 and the data programmed in the twelfth page PAGE 12 and the fourteenth page PAGE 14 adjacent thereto.

A situation in which a program operation of data is performed in a direction from the first page PAGE 1 to the sixteenth page PAGE 16 is illustrated. In this case, when data is to be programmed to the third page PAGE 3, the parity data $DATA_{PRT1}$ may be generated after both of the data programmed in the second page PAGE 2 and the data programmed in the fourth page PAGE 4 are obtained. In an embodiment, the controller 200 may generate the parity data $DATA_{PRT1}$, $DATA_{PRT2}$, and $DATA_{PRT3}$ after all data up to the sixteenth page of the memory block BLKp are programmed, that is, after the memory block BLKp is closed.

FIG. 10 is a diagram illustrating a memory block that stores the parity data according to an embodiment of the present disclosure.

Referring to FIG. 10, the generated parity data $DATA_{PRT1}$, $DATA_{PRT2}$, and $DATA_{PRT3}$ may be programmed to a memory block BLKq different from the memory block BLKp. Specifically, the parity data $DATA_{PRT1}$ may be programmed to the first page PAGE 1 of the memory block BLKq, the parity data $DATA_{PRT2}$ may be programmed to the second page PAGE 2 of the memory block BLKq, and the parity data $DATA_{PRT3}$ may be programmed to the third page PAGE 3 of the memory block BLKq. In an embodiment, the memory block BLKq may be a dedicated memory block for storing only the parity data. In addition, according to an embodiment, the parity data $DATA_{PRT1}$, $DATA_{PRT2}$, and $DATA_{PRT3}$ may be programmed to the memory block BLKq in an SLC method.

FIG. 11 is a flowchart illustrating a method of operating a controller according to an embodiment of the present disclosure. More specifically, FIG. 11 is a flowchart illustrating an operation method when data is programmed to the weak page.

Referring to FIG. 11, the method of operating the controller according to an embodiment of the present disclosure includes determining to program data in the selected page of the semiconductor memory device (S110), referring to the weak page information storage (S120), and determining whether the page to which data is to be programmed is the weak page (S130).

In operation S110, the controller 200 may determine to program data in the selected page of the semiconductor memory device based on a write request RQWT from the host device 20. As another example, the controller 200 may determine to program data in the selected page of the semiconductor memory device regardless of the write request RQWT from the host device 20. For example, the controller 200 independently may determine to program valid data from a victim block to the selected page of the semiconductor memory device according to a garbage collection operation.

In operation S120, in order to determine whether the page to which the data is to be programmed is the weak page, the controller 200 refers to the weak page information storage 231 in the data recovery manager 230. When the page to which the data is to be programmed is not the weak page (S130: No), the parity data may not be generated.

In addition, the method of operating the controller according to an embodiment of the present disclosure may further include generating the parity data based on the data programmed in the weak page and the data programmed in the adjacent page (S140), when the page to which the data is to be programmed is the weak page (S130: Yes), storing the parity data in the controller (S150), and controlling the semiconductor memory device to program the parity data (S160).

In operation S140, the parity data may be generated in a method shown in FIG. 9A or the parity data may be generated in a method shown in FIG. 9B. In operation S140, the read command for reading corresponding data may be generated to obtain the data programmed in the adjacent page. When the data programmed in the adjacent page is also cached in a buffer in the controller 200, the parity data may be generated based on the cached data without generating the read command.

The parity data generated in operation S150 may be stored in the parity data storage 235 in the data recovery manager 230. In addition, in operation S160, the program command for programming the parity data may be generated, and the generated program command may be transmitted to the semiconductor memory device together with the parity data. According to an embodiment of the present disclosure, both of operations S150 and S160 may be performed. In this case, the parity data may be stored in both of the parity data storage 235 and the memory block BLKq of the semiconductor memory device. According to an embodiment, only one of the operation S150 and S160 may be selectively performed.

Although not shown in FIG. 11, after operation S110, generating the program command for programming data in the selected page, and transmitting the generated program command to the semiconductor memory device may be performed. However, this operation may be performed at any operation after operation S110. For example, immediately after operation S110 is performed and before operation S120 is performed, the controller may generate the program command and transmit the program command to the semiconductor memory device together with program data. Alternatively, after the operation S160 is performed, the controller may generate the program command and transmit the program command to the semiconductor memory device together with the program data. That is, a performance time of generating the program command for programming the data in the selected page and transmitting the generated program command to the semiconductor memory device may be variously changed according to a design.

Figure 12A:
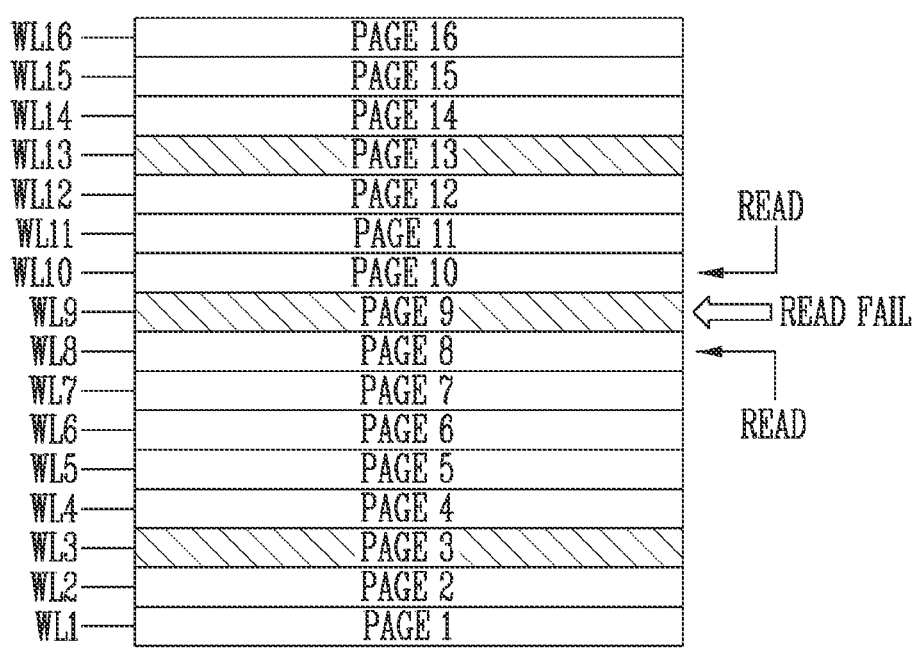
FIGS. 12A and 12B are diagrams illustrating a method of recovering data programmed in a weak page according to an embodiment of the present disclosure.
Figure 12B:
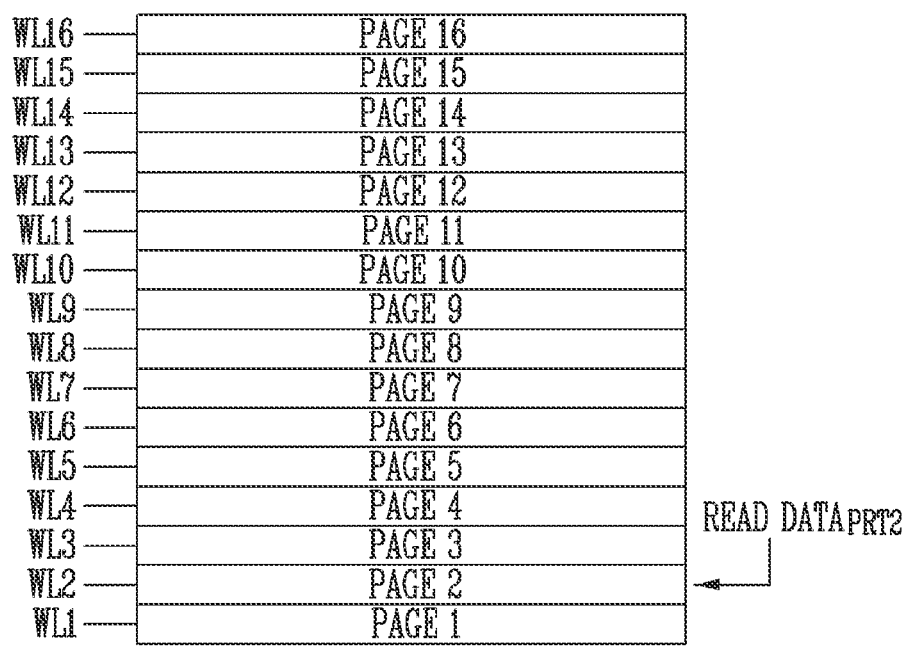

FIGS. 12A and 12B are diagrams illustrating a method of recovering data programmed in a weak page according to an embodiment of the present disclosure. Hereinafter, the present disclosure is described based on an embodiment in which the parity data is generated by the method shown in FIG. 9B.

Referring to FIG. 12A, a situation in which the data programmed in the ninth page PAGE 9 which is the weak page of the memory block BLKp is read is shown. When an uncorrectable error is included in read data as a result of reading the data from the ninth page PAGE 9, it may be determined that a read failure occurs. According to a method of operating a controller according to an embodiment of the present disclosure, when an operation of reading the data stored in the weak page is failed, the data programmed in the weak page is recovered based on the data stored in the adjacent page and the parity data. As shown in FIG. 12A, the controller 200 may control the semiconductor memory device 100 to read the data from the eighth page PAGE 8 and the tenth page PAGE 10 adjacent to the ninth page PAGE 9.

In addition, as shown in FIG. 12B, the controller 200 may control the semiconductor memory device 100 to read the parity data $DATA_{PRT2}$ from the memory block BLKq. The parity data $DATA_{PRT2}$ is the parity data corresponding to the ninth page PAGE 9 of the memory block BLKp.

The controller 200 may recover the data programmed in the ninth page PAGE 9 based on the data programmed in the eighth page PAGE 8 in the read memory block BLKp, the data programmed in the tenth page PAGE 10, and the parity data $DATA_{PRT2}$ in the memory block BLKq. Specifically, the data programmed in the ninth page PAGE 9 may be recovered by performing an XOR operation on the parity data $DATA_{PRT2}$, and the data programmed in the eighth page PAGE 8 and the data programmed in the tenth page PAGE 10 adjacent to the ninth page PAGE 9.

The data recovery operation described with reference to FIGS. 12A and 12B may be performed by the command generator 210 and the data recovery manager 230 shown in FIG. 6. First, in order to check whether the data on which the read operation is failed is the data programmed in the weak page, the data recovery manager 230 may refer to the weak page information storage 231 and check whether the page corresponding to the read address is the weak page. When it is checked that the data on which the read operation is failed is the data programmed in the weak page, the weak page information storage 231 generates the control signal for controlling the command generator 210 to generate the read command for reading each of the data from the eighth page PAGE 8 in the memory block BLKp, the data from the tenth page PAGE 10, and the parity data $DATA_{PRT2}$ from the memory block BLKq. The command generator 210 may generate the read command for reading the data from the eighth page PAGE 8 in the memory block BLKp, the data from the tenth page PAGE 10, and the parity data $DATA_{PRT2}$ from the memory block BLKq under control of the weak page information storage 231, and transmit the generated read command to the semiconductor memory device 100.

The parity data generator 233 may receive the data programmed in the eighth page PAGE 8 in the memory block BLKp and the data programmed in the tenth page PAGE 10 from the semiconductor memory device 100. The parity data generator 233 may receive the parity data $DATA_{PRT2}$ from the semiconductor memory device 100 or may receive the parity data $DATA_{PRT2}$ from the parity data storage 235 according to an embodiment. The parity data generator 233 may recover the data programmed in the ninth page PAGE 9 by performing an XOR operation on the data programmed in the eighth page PAGE 8, the data programmed in the tenth page PAGE 10, and the parity data $DATA_{PRT2}$.

FIG. 13 is a flowchart illustrating a method of operating a controller according to another embodiment of the present disclosure. Hereinafter, the present disclosure is described together with the example described with reference to FIGS. 12A and 12B.

Referring to FIG. 13, the method of operating the controller according to the other embodiment of the present disclosure includes controlling the semiconductor memory device to read the data from the selected page (S210), performing an error correction operation on the read data (S220), determining whether error correction is failed (S230), referring to the weak page information storage (S240), determining whether the selected page is the weak page (S250), obtaining the parity data associated with the selected page and obtaining the data programmed in the page adjacent to the selected page (S260), recovering the data programmed in the selected page based on the parity data and the data programmed in the adjacent page (S270), determining whether the recovery of the data programmed in the selected page is successful (S280), and controlling the semiconductor memory device to read the data from the selected page again (S290).

In operation S210, the controller 200 controls the semiconductor memory device to read the data from the selected page among the pages included in the semiconductor memory device 100. Specifically, in operation S210, the controller may generate the read command for reading the data from the selected page, and transmit the generated read command to the semiconductor memory device 100. In response to the read command, the semiconductor memory device 100 may read the data from the selected page, and transmit the read data to the controller 200.

In operation S220, the controller 200 performs an error correction operation on the read data. When error correction is successful as a result of performing the error correction operation (S230: No), the read operation may be ended.

When an uncorrectable error is included in the read data includes as a result of performing the error correction operation (S230: Yes), the controller 200 refers to the weak page information storage 231 to determine whether the corresponding data is the data programmed in the weak page.

When the page storing the data in which the uncorrectable error occurs is not the weak page (S250: No), since the corresponding parity data does not exist, a data recovery operation based on the parity data is not performed and the method proceeds to operation S290. In operation S290, the semiconductor memory device may be controlled to re-read the data programmed in the selected page by various methods. For example, in operation S290, the controller 200 may control the semiconductor memory device to correct the read voltage based on a read-retry table, and then read the data from the selected page based on the corrected read voltage. Alternatively, in operation S290, the controller 200 may control the semiconductor memory device to correct the read voltage by searching for a valley between threshold voltage distributions of the memory cells included in the selected page, and read the data from the selected page based on the corrected read voltage. However, this is an example, and in operation S290, the semiconductor memory device may be controlled to re-perform the read operation according to various other methods.

When the page storing the data in which the uncorrectable error occurs is the weak page (S250: Yes), the controller 200 may obtain the parity data associated with the selected page and the data programmed in the page adjacent to the selected page (S260). Specifically, as described with reference to FIGS. 12A and 12B, in operation S260, the controller 200 may control the semiconductor memory device to read the data from the pages PAGE 8 and PAGE 10 adjacent to the selected page PAGE 9, and the parity data $DATA_{PRT2}$.

In operation S270, the controller 200 may recover the data programmed in the selected page based on the obtained parity data and the data programmed in the adjacent page. Specifically, the parity data generator 233 may perform an XOR operation on the data programmed in the eighth page PAGE 8 adjacent to the ninth page PAGE 9 which is the weak page in which an uncorrectable error occurs, the data programmed in the tenth page PAGE 10, and the parity data $DATA_{PRT2}$. As a result of the XOR operation, the data programmed in the ninth page PAGE 9 may be recovered. In this disclosure, when data programmed in a page is recovered during a read operation, the data read from the page may also be recovered during the read operation.

In operation S280, it is determined whether the data read from the selected page is recovered. When all of the data programmed in the eighth page PAGE 8, the data programmed in the tenth page PAGE 10, and the parity data $DATA_{PRT2}$ are normally read, the data read from the ninth page PAGE 9 may also be normally recovered. On the other hand, when an uncorrectable error is included in at least one of the data read from the eighth page PAGE 8, the data read from the tenth page PAGE 10, and the parity data $DATA_{PRT2}$, the data recovery of the ninth page PAGE 9 may be failed. When the data recovery of the selected page, that is, the ninth page PAGE 9 is successful (S280: Yes), a read process of the selected page may be ended. When the data recovery of the selected page, that is, the ninth page PAGE 9 is failed (S280: No), the method may proceed to operation S290. As described above, in operation S290, the semiconductor memory device may be controlled to re-perform the read operation on the selected page according to various other methods.

Figure 14:
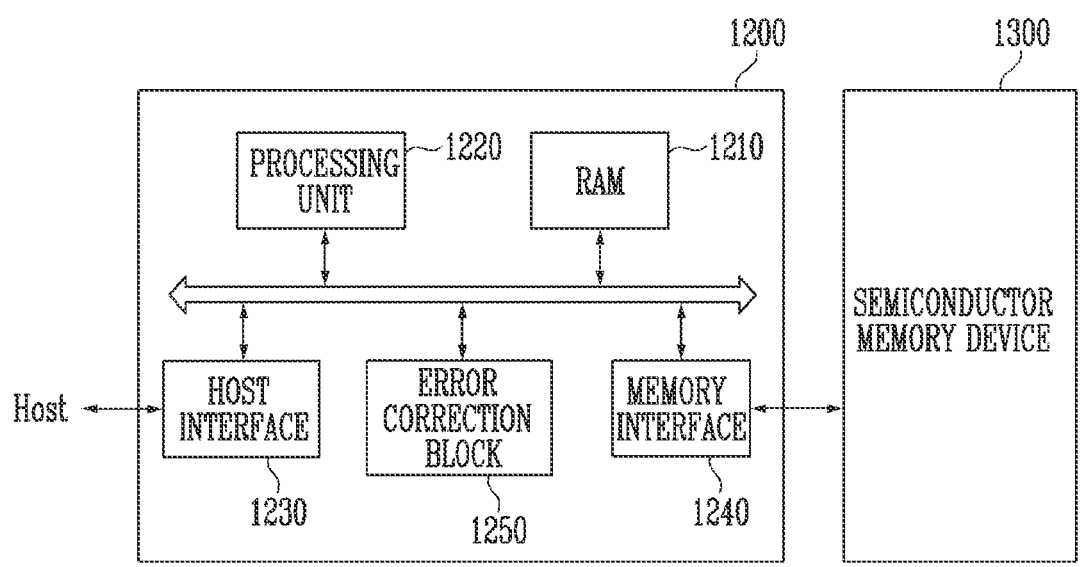
FIG. 14 is a block diagram illustrating a storage device including a semiconductor memory device and a controller according to an embodiment of the present disclosure.

FIG. 14 is a block diagram illustrating a storage device 1000 including a semiconductor memory device and a controller according to an embodiment of the present disclosure.

The semiconductor memory device 1300 of FIG. 14 may be configured and may operate similarly to the semiconductor memory device 100 described with reference to FIG. 2.

The controller 1200 is connected to a host device Host and the semiconductor memory device 1300. The controller 1200 is configured to access the semiconductor memory device 1300 in response to a request from the host device Host. For example, the controller 1200 is configured to control read, program, erase, and background operations of the semiconductor memory device 1300. The controller 1200 is configured to provide an interface between the semiconductor memory device 1300 and the host device Host. The controller 1200 is configured to drive firmware for controlling the semiconductor memory device 1300.

The controller 1200 includes a random access memory (RAM) 1210, a processing unit 1220, a host interface 1230, a memory interface 1240, and an error correction block 1250.

The RAM 1210 is used as one of an operation memory of the processing unit 1220, a cache memory between the semiconductor memory device 1300 and the host device Host, and a buffer memory between the semiconductor memory device 1300 and the host device Host. According to an embodiment of the present disclosure, at least one of the weak page information storage 231 and the parity data storage 235 of FIG. 7 may be implemented as the RAM 1210 of FIG. 14.

The processing unit 1220 controls an overall operation of the controller 1200. The processing unit 1220 is configured to control the read, program, erase, and background operations of the semiconductor memory device 1300. The processing unit 1220 is configured to drive firmware for controlling the semiconductor memory device 1300. The processing unit 1220 may perform a function of a flash translation layer (FTL). The processing unit 1220 may convert a logical block address (LBA) provided by the host device into a physical block address (PBA) through the FTL. The FTL may receive the logical block address (LBA) by using a mapping table and convert the LBA into the PBA. There are several address mapping methods of the FTL according to a mapping unit. A representative address mapping method includes a page mapping method, a block mapping method, and a hybrid mapping method.

In an embodiment of the present disclosure, the command generator 210 shown in FIG. 6 may be implemented as the firmware driven by the processing unit 1220 of FIG. 14. In addition, the parity data generator 233 shown in FIG. 7 may also be implemented as the firmware driven by the processing unit 1220 of FIG. 14.

The host interface 1230 includes a protocol for performing data exchange between the host device Host and the controller 1200. In an embodiment, the controller 1200 is configured to communicate with the host device Host through at least one of various communication standards or interfaces such as a universal serial bus (USB) protocol, a multimedia card (MMC) protocol, a peripheral component interconnection (PCI) protocol, a PCI-express (PCI-E) protocol, an advanced technology attachment (ATA) protocol, a serial-ATA protocol, a parallel-ATA protocol, a small computer system interface (SCSI) protocol, an enhanced small disk interface (ESDI) protocol, an integrated drive electronics (IDE) protocol, and a private protocol.

The memory interface 1240 interfaces with the semiconductor memory device 1300. For example, the memory interface 1240 includes a NAND interface or a NOR interface.

The error correction block 1250 is configured to detect and correct an error of data received from the semiconductor memory device 1300 using an error correcting code (ECC). The error correction block 1250 may correct an error by using the ECC on read page data. The error correction block 1250 may correct an error by using a coded modulation such as a low density parity check (LDPC) code, a Bose, Chaudhri, Hocquenghem (BCH) code, a turbo code, a Reed-Solomon code, a convolution code, a recursive systematic code (RSC), a trellis-coded modulation (TCM), a block coded modulation (BCM), and a hamming code.

During a read operation, the error correction block 1250 may correct an error of the read page data. Decoding may be failed when the read page data includes error bits that exceed a correctable number of bits. The decoding may be successful when the page data includes error bits equal to or less than the correctable number of bits. The success of the decoding indicates that a read command is passed. The failure of the decoding indicates that the read command is failed. When the decoding is successful, the controller 1200 outputs the page data in which the error is corrected to the host.

The controller 1200 and the semiconductor memory device 1300 may be integrated into one semiconductor device. In an embodiment, the controller 1200 and the semiconductor memory device 1300 may be integrated into one semiconductor device to configure a memory card. For example, the controller 1200 and the semiconductor memory device 1300 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, or MMCmicro), an SD card (SD, miniSD, microSD, or SDHC), and a universal flash storage (UFS).

The controller 1200 and the semiconductor memory device 1300 may be integrated into one semiconductor device to configure a semiconductor drive (solid state drive (SSD)). The semiconductor drive (SSD) includes a storage device configured to store data in the semiconductor memory. When the storage device is used as the semiconductor drive (SSD), an operation speed of the host device Host connected to the storage device is dramatically improved.

As another example, the storage device 1000 is provided as one of various components of an electronic device such as a computer, an ultra-mobile PC (UMPC), a workstation, a net-book, a personal digital assistants (PDA), a portable computer, a web tablet, a wireless phone, a mobile phone, a smart phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player, a device capable of transmitting and receiving information in a wireless environment, one of various electronic devices configuring a home network, one of various electronic devices configuring a computer network, one of various electronic devices configuring a telematics network, an RFID device, or one of various components configuring a computing system.

In an embodiment, the semiconductor memory device 1300 or the storage device may be mounted as a package of various types. For example, the semiconductor memory device 1300 or the storage device may be packaged and mounted in a method such as a package on package (PoP), ball grid arrays (BGAs), chip scale packages (CSPs), plastic leaded chip carriers (PLCC), a plastic dual in line package (PDIP), a die in waffle pack, die in wafer form, a chip on board (COB), a ceramic dual in line package (CERDIP), a plastic metric quad flat pack (MQFP), a thin quad flat pack (TQFP), a small outline integrated circuit (SOIC) package, a shrink small outline package (SSOP), a thin small outline package (TSOP), a system in package (SIP), a multi-chip package (MCP), a wafer-level fabricated package (WFP), or a wafer-level processed stack package (WSP).

Figure 15:
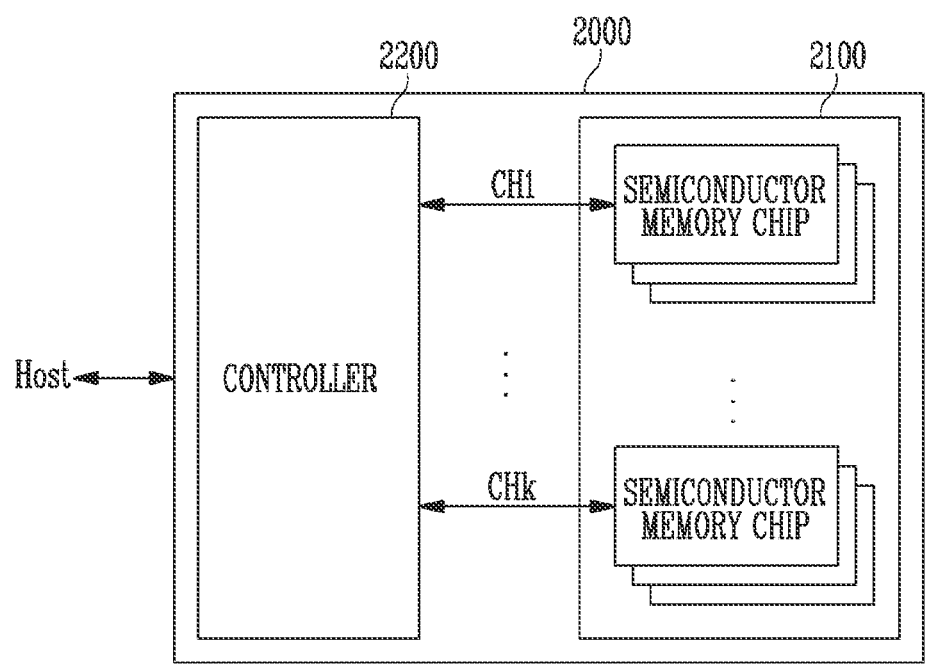
FIG. 15 is a block diagram illustrating an application example of the storage device of FIG. 14 according to an embodiment of the present disclosure.

FIG. 15 is a block diagram illustrating an application example 2000 of the storage device of FIG. 14 according to an embodiment of the present disclosure.

Referring to FIG. 15, the storage device 2000 includes a semiconductor memory device 2100 and a controller 2200. The semiconductor memory device 2100 includes a plurality of semiconductor memory chips. The plurality of semiconductor memory chips are divided into a plurality of groups.

In FIG. 15, the plurality of groups communicate with the controller 2200 through first to k-th channels CH1 to CHk, respectively. Each semiconductor memory chip is configured and is operated similarly to the semiconductor memory device 1300 described with reference to FIG. 14.

Each group is configured to communicate with the controller 2200 through one common channel. The controller 2200 is configured similarly to the controller 1200 described with reference to FIG. 14 and is configured to control the plurality of memory chips of the semiconductor memory device 2100 through the plurality of channels CH1 to CHk.

In FIG. 15, the plurality of semiconductor memory chips are connected to one channel. However, it will be understood that the storage device 2000 may be modified so that one semiconductor memory chip is connected to one channel.

Figure 16:
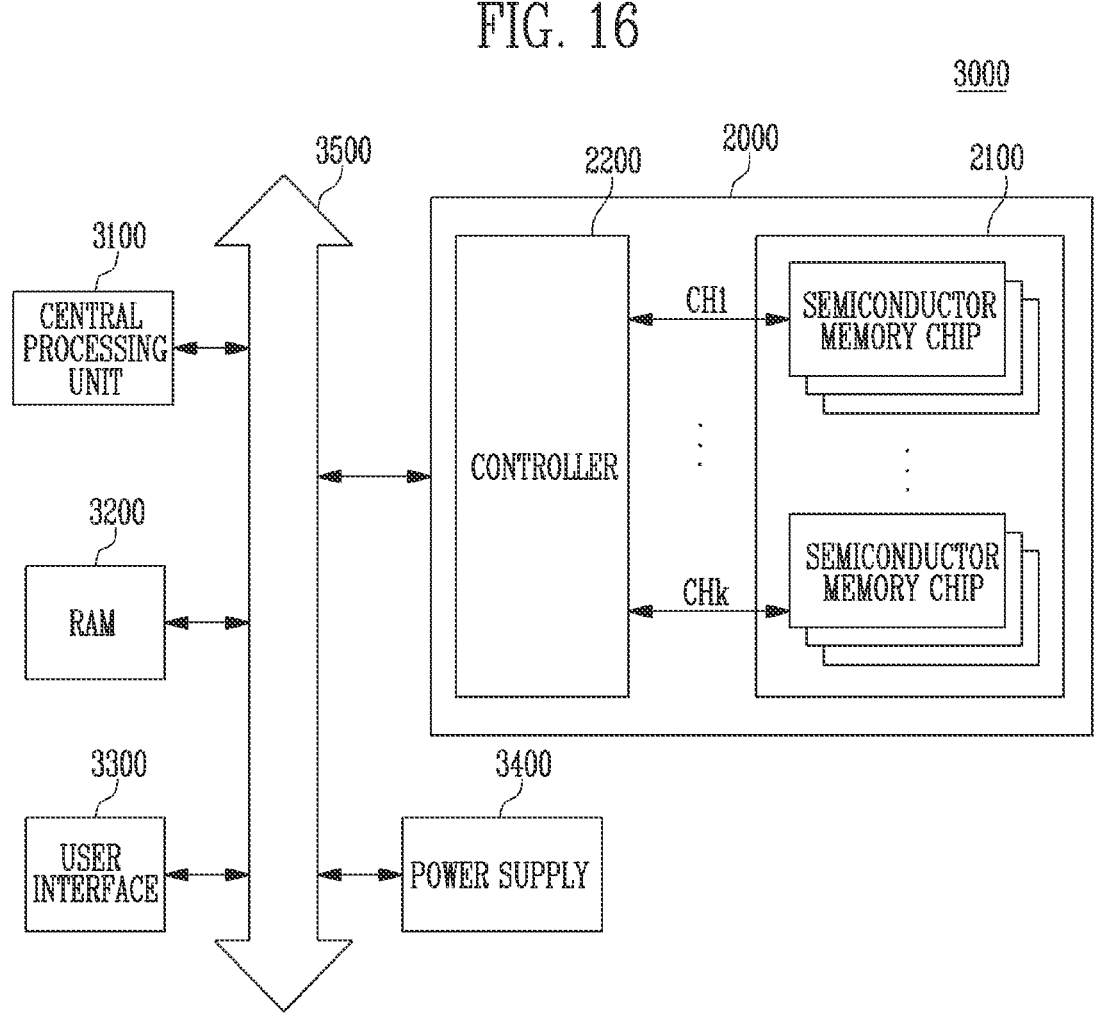
FIG. 16 is a block diagram illustrating a computing system including the storage device described with reference to FIG. 15 according to an embodiment of the present disclosure.

FIG. 16 is a block diagram illustrating a computing system including the storage device described with reference to FIG. 15 according to an embodiment of the present disclosure.

Referring to FIG. 16, the computing system 3000 includes a central processing unit 3100, a random access memory (RAM) 3200, a user interface 3300, a power supply 3400, a system bus 3500, and the storage device 2000.

The storage device 2000 is electrically connected to the central processing unit 3100, the RAM 3200, the user interface 3300, and the power supply 3400 through the system bus 3500. Data provided through the user interface 3300 or processed by the central processing unit 3100 is stored in the storage device 2000.

In FIG. 16, the semiconductor memory chip 2100 is connected to the system bus 3500 through the controller 2200. However, the semiconductor memory chip 2100 may be configured to be directly connected to the system bus 3500. At this time, a function of the controller 2200 is performed by the central processing unit 3100 and the RAM 3200.

In FIG. 16, the storage device 2000 described with reference to FIG. 15 is provided. However, the storage device 2000 may be replaced with the storage device 1000 described with reference to FIG. 14. In an embodiment, the computing system 3000 may be configured to include both of the storage devices 1000 and 2000 described with reference to FIGS. 14 and 15.

While the present disclosure has been illustrated and described with respect to specific embodiments, it will be apparent to those skilled in the art that various changes and modifications may be made without departing from the spirit and scope of the present disclosure as defined in the following claims. Therefore, the scope of the present disclosure encompasses all variations that fall within the scope of the claims including their equivalents. Furthermore, the embodiments may be combined to form additional embodiments.

What is claimed is:

1. A controller comprising:
a processing unit configured to:
generate a command for controlling a program operation or a read operation of a semiconductor memory device;
generate parity data corresponding to a weak page among a plurality of pages included in the semiconductor memory device, the weak page is an i-th page; and
recover data programmed in the weak page based on the parity data, and
a data storage configured to store the parity data,
wherein the processing unit generates the parity data by performing an exclusive-OR (XOR) operation on data programmed in the weak page and data programmed in an (i−1)-th page.

2. The controller of claim 1, wherein the processing unit generates the parity data by performing an exclusive-OR (XOR) operation on the data programmed in the weak page, the data programmed in the (i−1)-th page and data programmed in an (i+1)-th page.

3. The controller of claim 1, wherein the processing unit generates the command for controlling the semiconductor memory device to program the parity data to a memory block different from a memory block including the weak page.

4. The controller of claim 1, wherein the processing unit stores
a weak page information for identifying weak pages among the plurality of pages
and the parity data in the data storage.

5. The controller of claim 1, wherein the processing unit generates the command for controlling the semiconductor memory device to read data stored in the weak page, and
recovers the data programmed in the weak page based on the parity data and the data programmed in pages adjacent to the weak page when an uncorrectable error is included in the data programmed in the weak page.

6. The controller of claim 5, wherein the processing unit recovers the data programmed in the weak page by performing an exclusive-OR (XOR) operation on the parity data and the data programmed in the pages adjacent to the weak page.

7. A method of operating a controller, the method comprising:
determining whether to program data to a selected page among a plurality of pages included in a semiconductor memory device;
determining whether the selected page is a weak page; and
generating parity data based on data programmed in the selected page and data programmed in one or more pages adjacent to the selected page when the selected page is determined as the weak page,
wherein the generating the parity data comprises:
determining a page adjacent to the weak page is an (i−1)-th page when the weak page is an i-th page; and
generating the parity data by performing an exclusive-OR (XOR) operation on data programmed in the page adjacent to the weak page and data programmed in the weak page.

8. The method of claim 7, wherein the generating the parity data comprises:
determining pages adjacent to the weak page are (i−1)-th and (i+1)-th pages when the weak page is an i-th page; and
generating the parity data by performing an exclusive-OR (XOR) operation on data programmed in the pages adjacent to the weak page and the data programmed in the weak page.

9. The method of claim 7, further comprising storing the parity data in the controller.

10. The method of claim 7, further comprising controlling the semiconductor memory device to program the parity data to a memory block different from a memory block including the weak page.

11. The method of claim 10, wherein the memory block different from the memory block including the weak page includes single-level cells (SLCs).

12. A method of operating a controller, the method comprising:
controlling a semiconductor memory device to read data programmed in a weak page among a plurality of pages included in the semiconductor memory device, the weak page is an i-th page;
receiving the read data from the semiconductor memory device and performing an error correction operation on the received data;
obtaining parity data associated with the weak page and data programmed in one or more pages adjacent to the weak page when error correction of the received data is determined as failed; and
recovering the data programmed in the weak page based on the parity data associated with the weak page and the data programmed in the pages adjacent to the weak page,
wherein the parity data is generated by performing an exclusive-OR (XOR) operation on data programmed in the weak page and data programmed in an (i−1)-th page.

13. The method of claim 12, wherein the parity data and the data programmed in the pages adjacent to the weak page are obtained by controlling the semiconductor memory device to read the parity data and read the data programmed in the pages adjacent to the weak page.

14. The method of claim 12, wherein:
the page adjacent to the weak page is the (i−1)-th page when the weak page is the i-th page, and
the data programmed in the weak page is recovered by performing an exclusive-OR (XOR) operation on the data programmed in the page adjacent to the weak page and the parity data.

15. The method of claim 12, wherein:
the pages adjacent to the weak page are the (i−1)-th page and an (i+1)-th page when the weak page is the i-th page, and
the data programmed in the weak page is recovered by performing an exclusive-OR (XOR) operation on the data programmed in the pages adjacent to the weak page and the parity data.

16. The method of claim 12, further comprising controlling the semiconductor memory device to read the data programmed in the weak page again when the recovering is failed.

17. The method of claim 16, wherein the semiconductor memory device is controlled to read the data programmed in the weak page again by changing a read voltage.

18. A memory system comprising:
a semiconductor memory device including a plurality of pages; and
a memory controller configured to control the semiconductor memory device,
wherein the memory controller comprises:
a processing unit configured to:
generate a command for controlling a program operation or a read operation of the semiconductor memory device;
generate parity data corresponding to an i-th page which is a weak page among the plurality of pages; and
recover data programmed in the weak page based on the parity data, and
a data storage configured to store the parity data,
wherein the processing unit generates the parity data by performing an exclusive-OR (XOR) operation on data programmed in the weak page and data programmed in an (i−1)-th page.

19. The memory system of claim 18, wherein the processing unit generates the parity data by performing an exclusive-OR (XOR) operation on the data programmed in the weak page, the data programmed in the (i−1)-th page and data programmed in an (i+1)-th page.

* * * * *